Dec. 15, 1959 W. F. ALLER 2,916,911

APPARATUS AND METHOD FOR SETTING UP DIMENSIONAL GAUGING DEVICES

Original Filed Jan. 21, 1950 8 Sheets-Sheet 1

INVENTOR.
W. F. Aller
BY Edward J. Noif
atty.

APPARATUS AND METHOD FOR SETTING UP DIMENSIONAL GAUGING DEVICES

Original Filed Jan. 21, 1950

INVENTOR.
W. F. Aller
BY
Edward J. Noi... 
Atty.

Dec. 15, 1959 W. F. ALLER 2,916,911

APPARATUS AND METHOD FOR SETTING UP DIMENSIONAL GAUGING DEVICES

Original Filed Jan. 21, 1950 8 Sheets-Sheet 3

INVENTOR.
W. F. Aller
BY
Edward J. Noi Jr
atty.

INVENTOR
W. F. Aller
BY Edward T. Ho...
atty

APPARATUS AND METHOD FOR SETTING UP DIMENSIONAL GAUGING DEVICES

Original Filed Jan. 21, 1950 8 Sheets-Sheet 5

INVENTOR
W. F. Aller
BY Edward J. Noe Jr.
atty

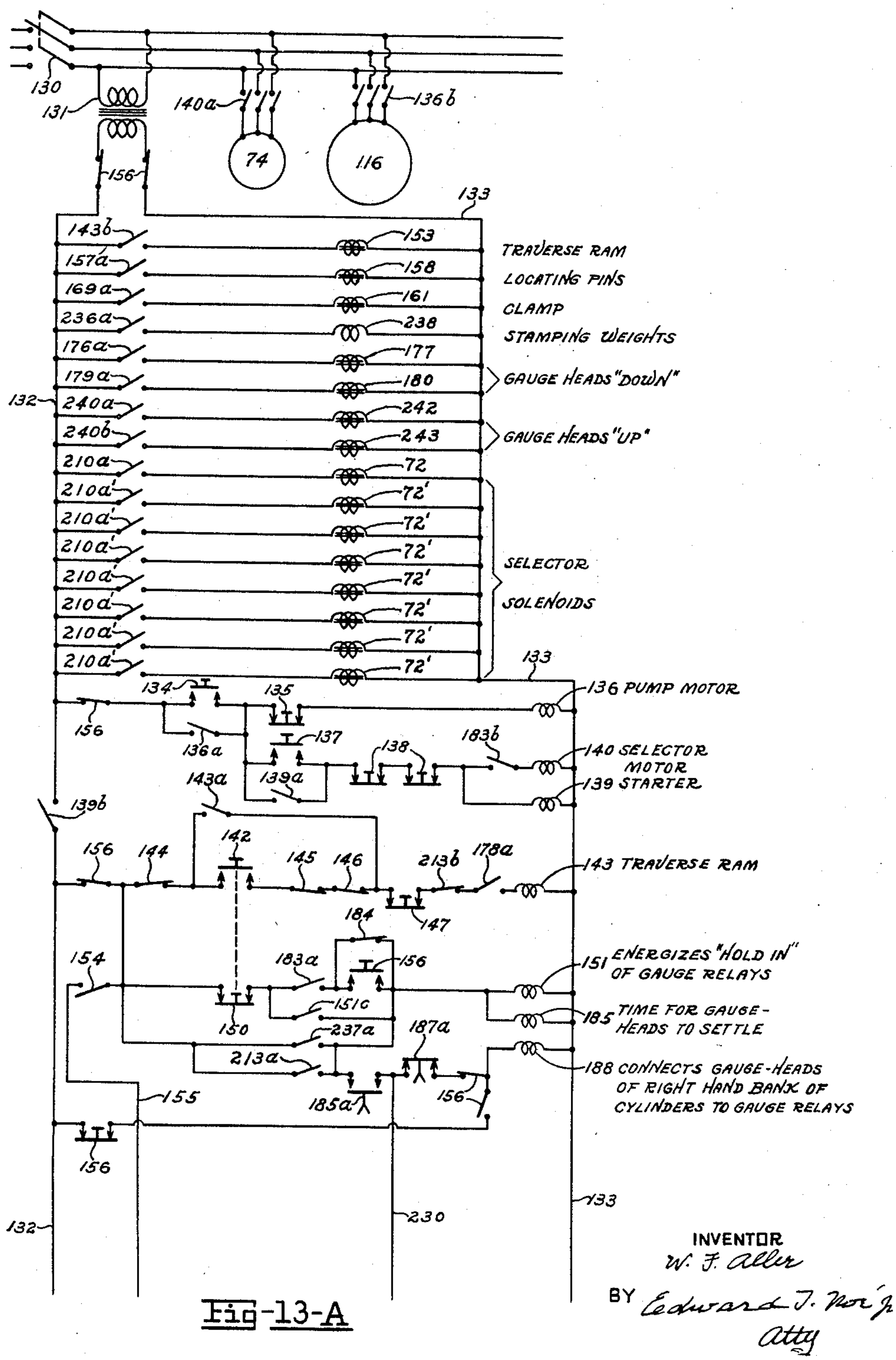
Fig-13-A
INVENTOR
W. F. Aller
BY Edward J. Nor Jr.
Atty

Dec. 15, 1959 W. F. ALLER 2,916,911
APPARATUS AND METHOD FOR SETTING UP DIMENSIONAL GAUGING DEVICES
Original Filed Jan. 21, 1950 8 Sheets-Sheet 7
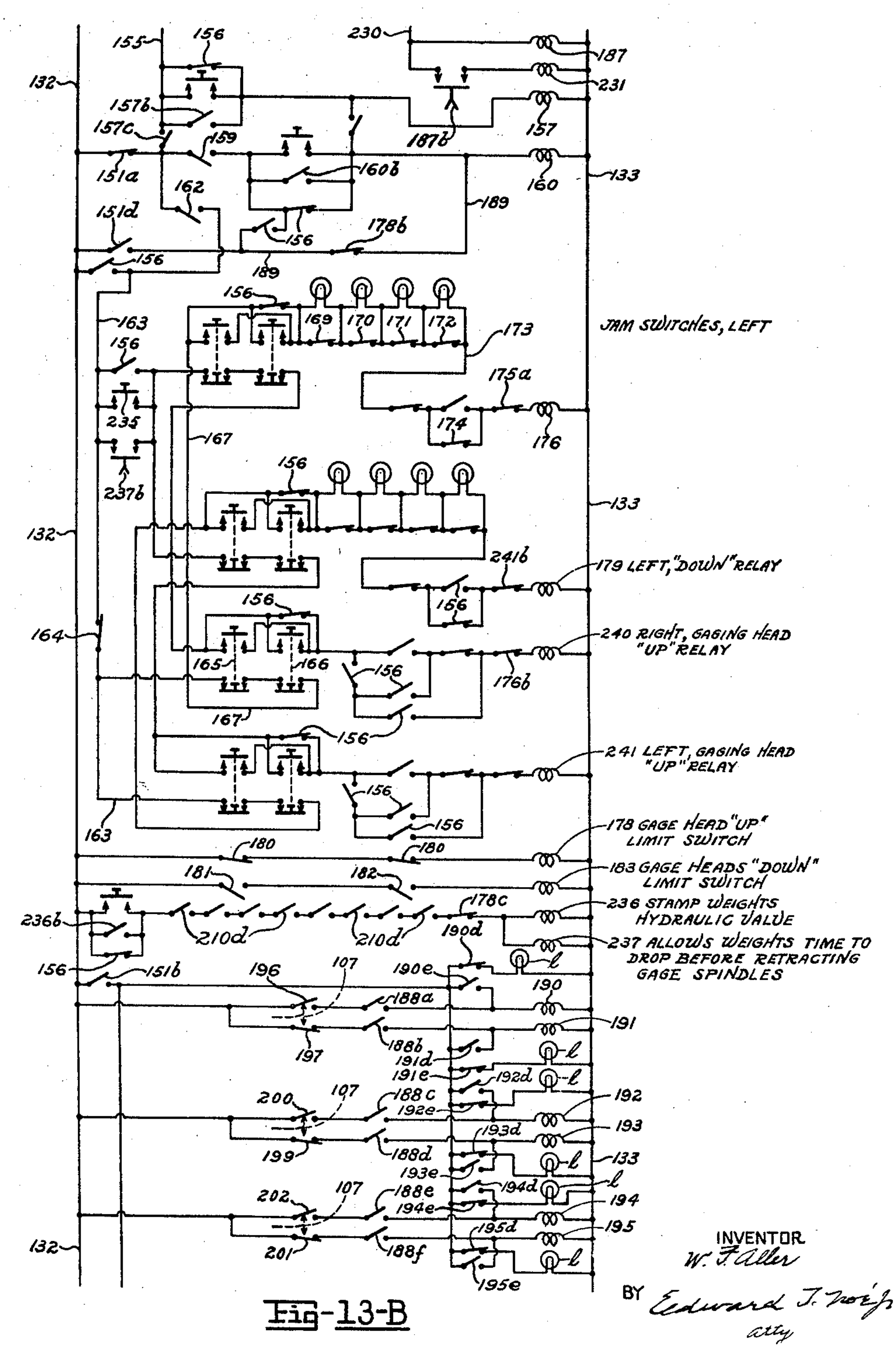
Fig-13-B
INVENTOR
W. F. Aller
BY Edward J. [illegible]
atty APPARATUS AND METHOD FOR SETTING UP DIMENSIONAL GAUGING DEVICES
Original Filed Jan. 21, 1950 8 Sheets-Sheet 8
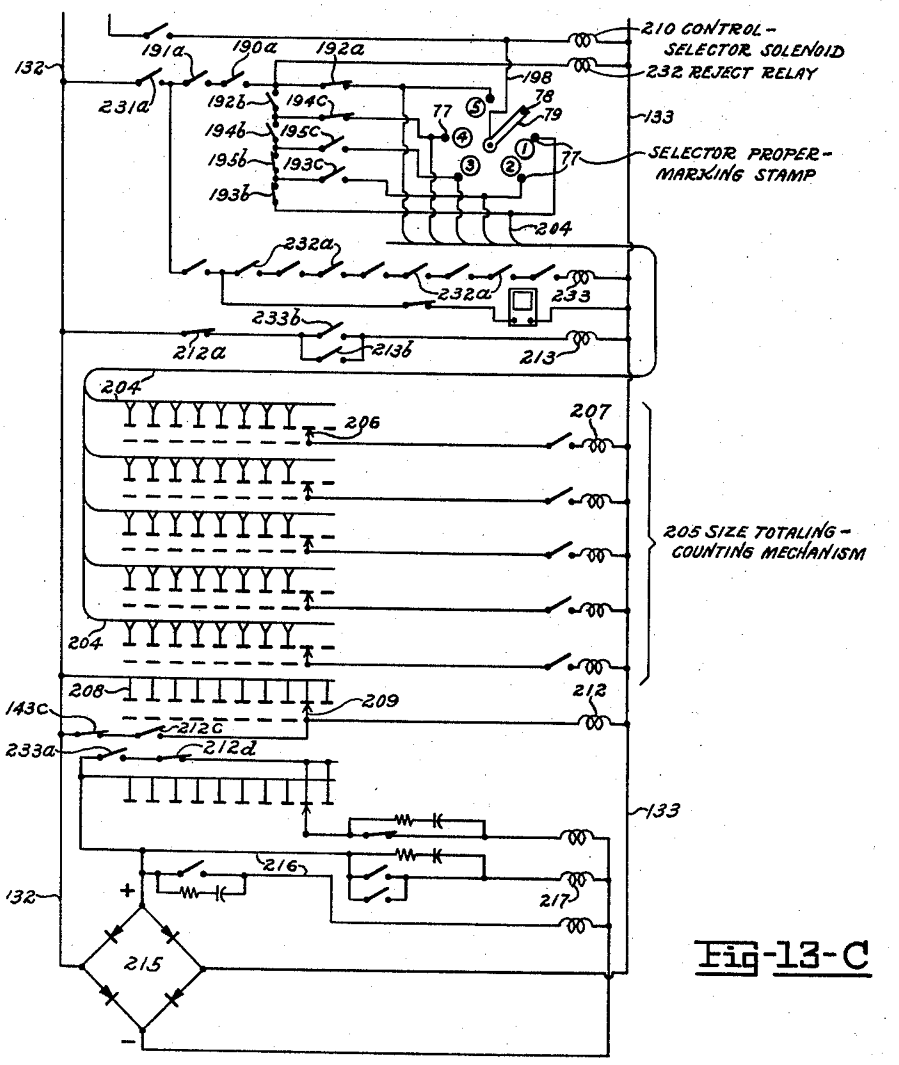
Fig-13-C
Fig-14
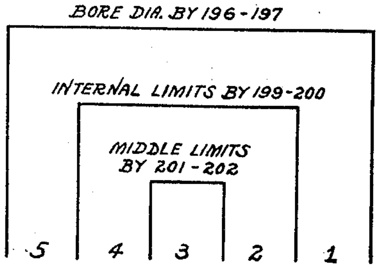
INVENTOR
W. F. Aller
BY Edward J. Noiz
atty United States Patent Office 2,916,911

Patented Dec. 15, 1959

2,916,911

APPARATUS AND METHOD FOR SETTING UP DIMENSIONAL GAUGING DEVICES

Willis Fay Aller, Dayton, Ohio, assignor to The Sheffield Corporation, a corporation of Delaware Original application January 21, 1950, Serial No. 139,891, now Patent No. 2,677,325, dated May 4, 1954. Divided and this application September 28, 1953, Serial No. 382,520

10 Claims. (Cl. 73—37.9)

This invention relates to gauging apparatus and more particularly to apparatus for gauging different dimensions of an article and marking the gauged classification according to the gauged sizes. This application is a division of my U.S. application, Serial No. 139,891, filed January 21, 1950, now Patent No. 2,677,325, issued May 4, 1954.

One object of the invention is to provide a gauging apparatus having a series of marking means each provided with different characters indicative of different article dimensions with provision for simultaneously and automatically applying the proper marks to the article in accordance with the gauging results.

Another object is the provision of a gauging apparatus having means for moving articles successively to a gauging station in which each article is gauged by a plurality of gauging heads that are movable from normally retracted positions to article engaging positions, such gauging heads providing gauging means for automatically selecting the positions of marking devices and with provision for automatically applying the marks to the articles in accordance with the sizes gauged.

Another object is the provision of a gauging apparatus of the character mentioned in which the marking devices are operated by weights or hammers to indent the indicia of the marking means into the article.

Another object is the provision of a gauging apparatus for selecting sizes in three or more classifications with provision for setting gauging switches providing for such classifications by means of only a maximum and a minimum master.

Another object is the provision of a gauging apparatus for gauging the sizes of bores in a block and adapted to conveniently place the block in gauging position and automatically carry out a gauging cycle in which the sizes of the bores are applied to the block.

In the particular adaptation of the invention herein disclosed the gauging apparatus provides a loading position in which a cylinder block may be placed. The normal gauging and classification cycle is then initiated automatically. A hydraulic ram carries the block into gauging position against a positive stop and a hydraulically actuated locating pin then locates the block in gauging position. Having been located, gauging heads which measure the sizes of the cylinder bores by measurement of the amount of air leakage between gauging nozzles in these heads and the surfaces of the cylinder bores are then automatically lowered into gauging position. If interference is encountered the descent of the gauging heads is stopped automatically. Having lowered the gauging heads to a predetermined depth the gauging and selecting sequences are started and during gauging sequence the gauging heads operate in conjunction with electric switches and selecting mechanism which control stamping devices. The selectors set up and hold the proper classification of the stamping mechanism. If all bores are within tolerance individual counters for each of the several classifications are actuated and indicate the number of pistons required for each corresponding classification so that the proper piston stock can be built up for assembly. The size classification of the cylinder bores are automatically stamped on the cylinder block adjacent each bore. Having been stamped, the gauging heads are all retracted simultaneously and the selecting devices operate to normal position. The block locating means are retraced leaving the block free to be pushed on through the machine as the next block is brought into gauging position.

Setting and calibration of the gauging device is made by means of maximum and minimum standard or master setting rings mounted in fixed position so that a gauging head can be withdrawn into one or the other of these setting rings for setup purposes, and provision is also made for setting the electric switches that provide, for example, five classifications of cylinder bore size merely by maximum and minimum masters and a calibrated pressure responsive device instead of requiring five different masters, one for each size classification.

With the above and other objects in view as will be more apparent from the following specification and the appended claims, reference is made to the accompanying drawing in which Fig. 1 is a plan view of a gauging apparatus embodying the present invention, portions being broken away to show certain features of the block feeding and locating mechanism;

Figure 1:
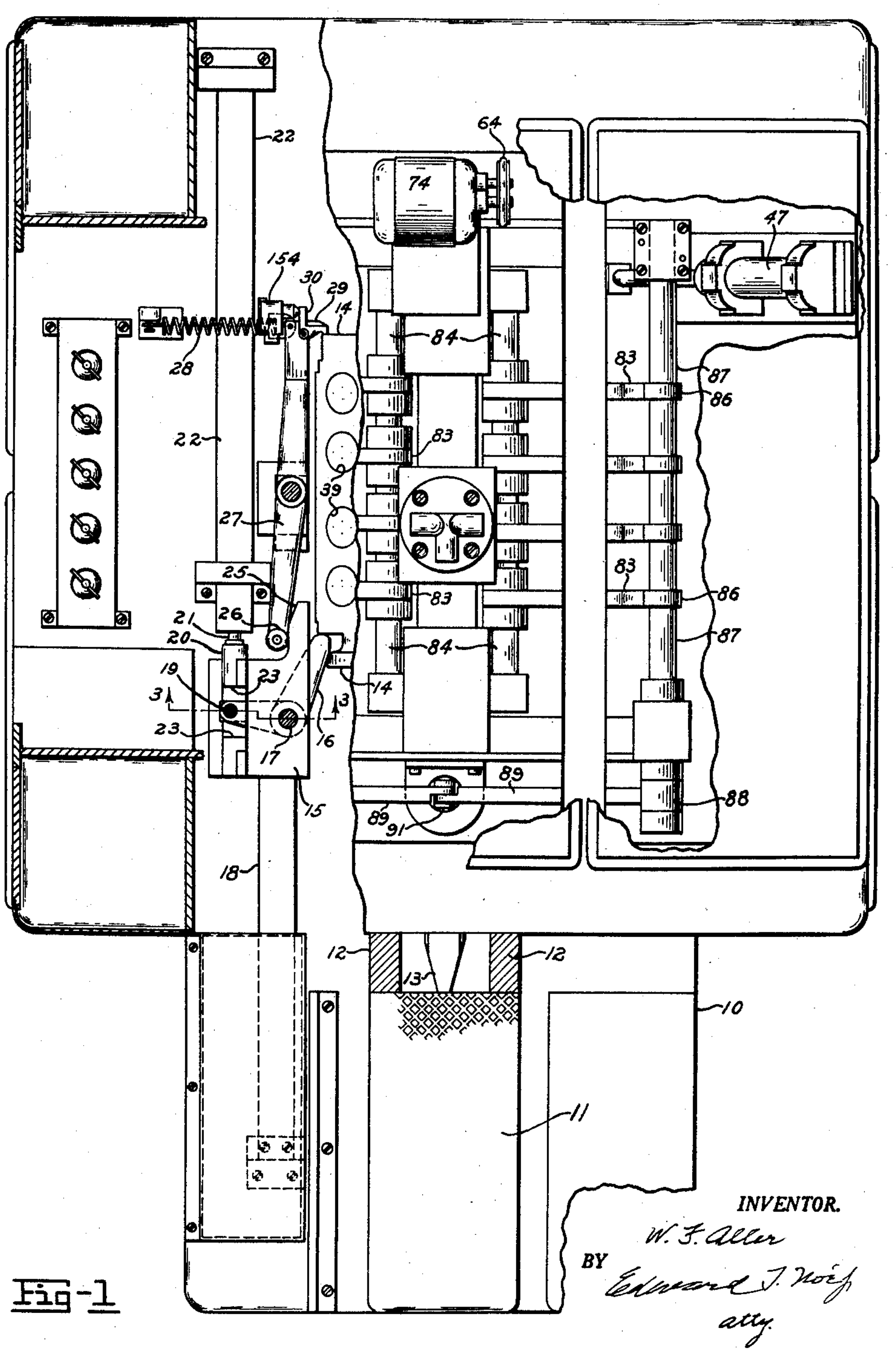

Figs. 13*a*, 13*b*, 13*c* together show the electrical connection or wiring diagram; and Fig. 14 is a chart of the classifications accomplished by the gauging switches.

Referring more particularly to the drawing in which the same reference numerals are supplied to like parts in the several views, the gauging apparatus in the particular embodiment herein illustrated is adapted to gauge the eight cylinder bores of a cylinder block and provide for five different size classifications in the acceptable size range. Obviously, the invention is applicable to other uses and it will be understood that the number of size classifications may be more or less than the figure chosen for exemplary purposes.

The apparatus comprises a main support or frame 10 having an article receiving stand or plate 11 on which the cylinder block to be gauged may be placed. Tracks 12 flush with the upper surface of the plate 11 extend rearwardly into the gauging apparatus and between the tracks 12 is a guide bar 13 which may be received in the longitudinal groove of the cylinder block, the block itself being indicated in Fig. 1 at 14 and shown in dot and dash lines in Fig. 2 where it is in gauging position inside the main housing. The cylinder block is moved from its position on the plate 11 by means ot a ram 15 which pivotally carries a bifurcated lever 16 on shaft 17. The ram 15 is guided on a stationary horizontal bar 18 and one end of the lever 16 is pivotally connected by means of a pin 19 to the end 20 of a piston rod 21 which operates in a long fluid pressure cylinder 22. When oil or other hydraulic fluid is supplied to one end of the cylinder 22 the piston rod 21 is ejected so as to move the lever 16 counter clockwise to a limited extent determined by abutments 23 on the feed block, thus first retracting the outer end of the arm 16 from the cylinder block and then picking up the ram 15 and moving it into position for engagement with a cylinder block on the plate 11. As fluid under pressure is supplied to the other end of the cylinder 22, a pull is first applied to the shorter end of the lever 16 to move the longer end of the lever out ready to pick up the cylinder block and as the piston 21 continues to move the ram 15 and the arm 16 move together and shove the cylinder block into gauging position as shown in Fig. 1. Just before the cylinder block reaches gauging position, a cam surface 25 on the ram 15 engages a roller 26 on the end of a pivoted lever 27 carried by the main frame and moves that lever clockwise against the action of a spring 28 so as to project a stop toe fixed on the other end of the lever 27 into the path of travel of the cylinder block and stop the movement of the cylinder block at the proper point in its feeding travel. Just before the cylinder block reaches the stop toe 29 it also engages and operates a switch controlling lever 30 carried by the lever 27 to control a switch 154 which controls a valve governing the supply of hydraulic fluid to a fluid pressure cylinder 35 (see Fig. 2) so that a bell crank lever 36 is moved counter clockwise into the position shown in Fig. 2 and projects a locating pin 37 into a hole provided at the proper place in the cylinder block to properly locate the cylinder block in exact gauging position. Promptly after this occurs a hydraulically controlled clamping ram 38 is lowered against the top of the block to assist in holding the block firmly in its located position.

The apparatus is provided at each side with four gauging heads which are normally in a raised or retracted position but which are lowered after the block is in gauging position so as to enter the four cylinder bores 39 on each side of an eight-cylinder engine block. One of these gauging heads is shown at 40 in Fig. 2 and another at 41 in Fig. 2, and although the head 41 is lowered as shown in the drawing for illustrative purposes it should be understood that in normal operation all of the gauging heads are moved downwardly or upwardly at the same time. The gauging heads are arranged on carrying bars 42 guided in sleeves 43 and normally held in a projected position with respect to the sleeve by means of springs 44. The four sleeves 43 at one side of the apparatus are carried by a slide 45 which is guided on the frame structure 46 and movable thereon by means of a pair of hydraulic cylinders 47 and piston rods 48. By supplying fluid to the upper ends of the hydraulic cylinders 47 the gauging heads may be lowered into the cylinder bores and by reversing the fluid supply they can be moved outwardly to a normally retracted position. The slide 45 has a rack at each end meshing with a pair of speed gears 49 which are fixed to a common shaft 50 to provide a force balance that prevents slide 45 from binding or cocking in its guideways. The four gauging heads at the opposite side of the apparatus are similarly mounted and controlled.

It will be understood that each gauging head, such as the gauging head 40, is provided with a pair of opposed fluid leakage nozzles 52 connected to an internal passage or tube extending along the rod 42 and to a pressure gauging circuit including a pressure gauge or other suitable flow measuring device such as the gauge 53 one of which is provided for each gauging head. A further explanation of the actual gauging operation will be given in connection with the switch controls that are operated by each gauging head in order to energize one of a series of circuits according to which particular one of the five classifications in the tolerance range of acceptable sizes corresponds to the particular cylinder bore gauged. In accordance with the selected contact of a particular cylinder bore gauging device there is an automatic control of a marking or stamping mechanism which applies the proper indicia to the cylinder block adjacent the cylinder bore gauged.

Figures 2, 3:
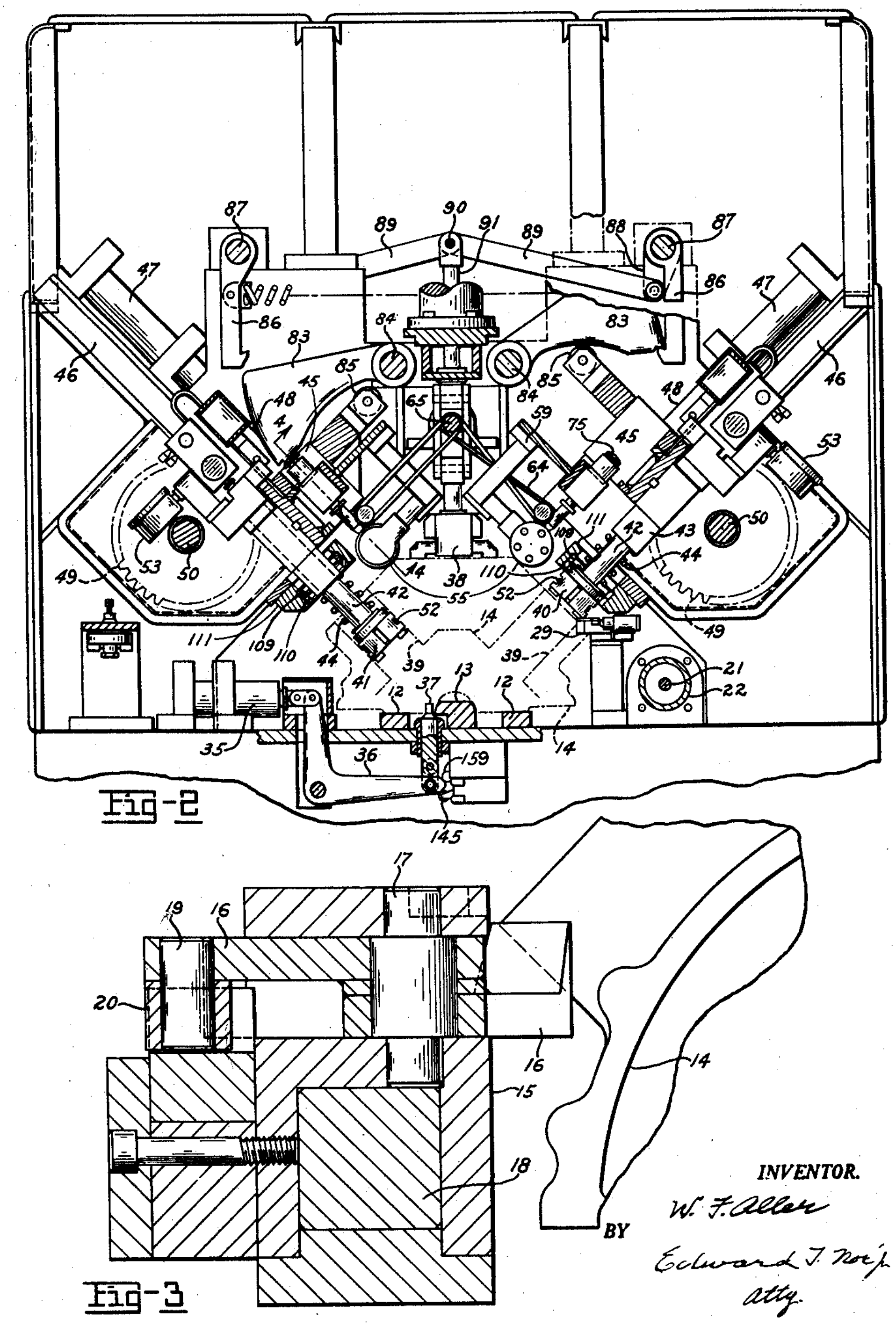
Fig. 2 is a front elevation of the gauging apparatus shown partly in section and looking in the direction towards which the objects travel through the apparatus.
Fig. 3 is a section on the line 3—3 of Fig. 1.

A marking mechanism as shown in Figs. 2 and 4 to 9 inclusive is provided for each gauging head. Each of these mechanisms has a series of characters of indicia such as numbers 1, 2, 3, 4 and 5, equally spaced on the periphery of a stamping roll 55 which is fixed on a shaft 56 journaled in the outer ends of two spaced carrying arms 57. These arms are fixed to one another and mounted for pivotal movement on a shaft 58 carried by a fixed bracket 59 on the frame 10. A spring 60 connected to the arms 57 normally holds these arms in a raised position in which the stamping roll 55 is slightly spaced away from the cylinder block and in this raised position of the arms 57 a drive roller 61 fixed to the shaft 56 engages a friction drive wheel 62 on a shaft 63 which is driven by a belt 64. The several belts of the several marking mechanisms are driven from a common shaft 65 as shown in Fig. 2 from a suitable driving motor 74 shown in Fig. 1. The shaft 63 is carried by an arm 66 pivotally supported on the stationary bracket 59 as will be apparent from Figs. 4, 5 and 7.

Figures 4, 5, 6, 7, 8, 9:
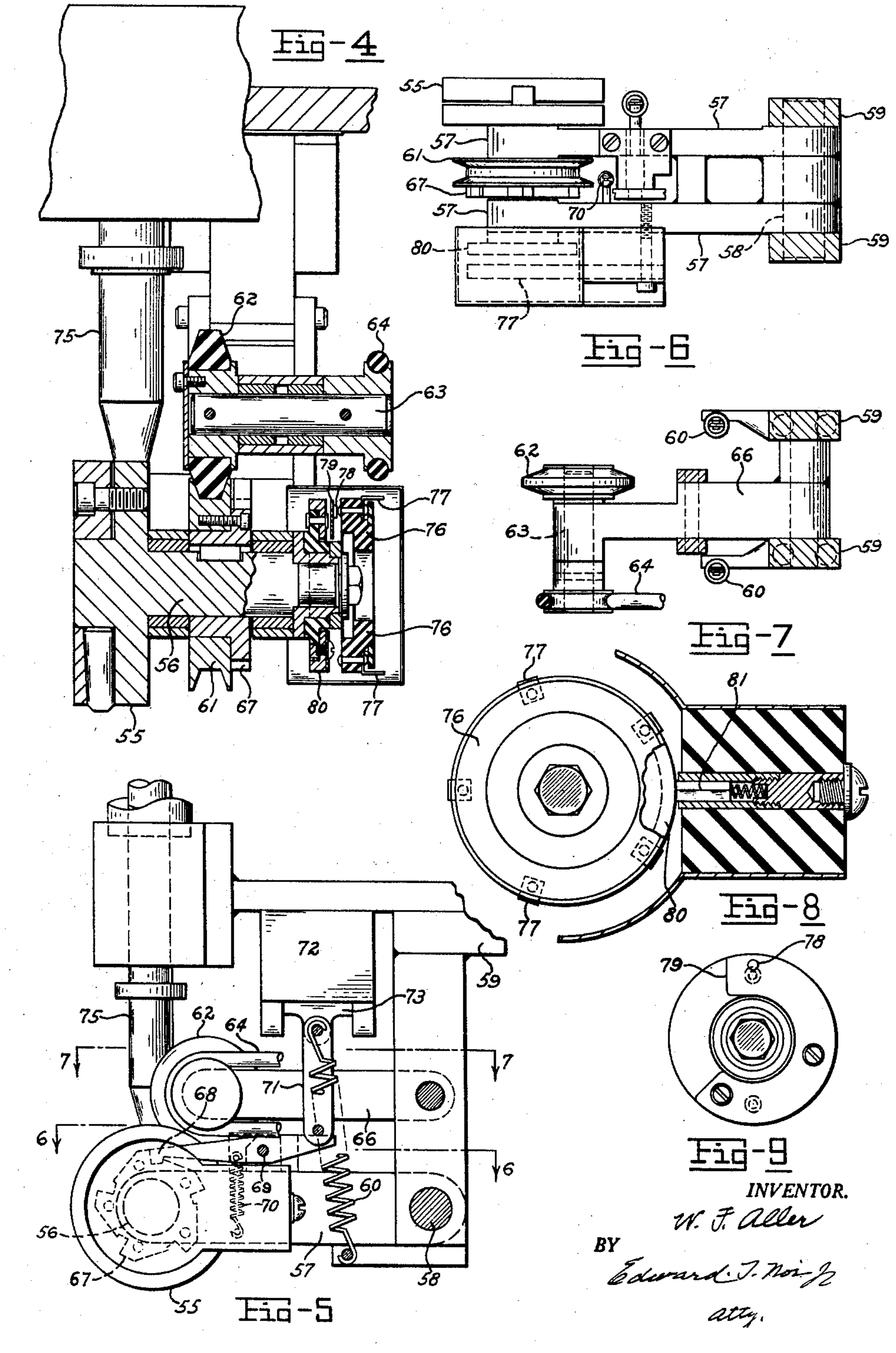
Fig. 4 is a sectional view through one of the marking mechanisms taken on the line 4—4 of Fig. 2.
Fig. 5 is a side elevation of the marking mechanism.
Fig. 6 is a section on the line 6—6 of Fig. 5.
Fig. 7 is a section on the line 7—7 of Fig. 5.
Fig. 8 is a detail view on an enlarged scale showing how the electrical connection is made between the rotating brush and the non-rotating parts of the character selecting device of the marking mechanism.
Fig. 9 is a detail showing the rotating brush which contacts successively with the several electrical terminals on the stationary connection block.

It will be understood that the continuously driven friction wheel 62 rotates the stamping wheel 55 continuously until the stamping wheel is stopped and this occurs when teeth 67 on the wheel 61 are engaged by a pawl lever 68 pivotally carried at 69, see Fig. 5, and yieldingly urged counterclockwise by a spring 70. Normally the spring 70 is overcome and the pawl 68 is raised from the teeth 67 by means of the spring 60 which holds a link 71 lowered and engaged with and depressing the projecting end of the pawl lever 68. Spring 60 is overcome when an electromagnet 72 is energized and this takes place at the proper time in the gauging cycle so as to raise the link 71 which is connected to the armature 73 of the electromagnet, thus permitting the pawl 68 to be lowered by spring 70 into engagement with the proper depression of the stop wheel 67 which is thus arrested, stopping the rotation of the stamping wheel so that the proper numeral is facing the adjacent surface of the cylinder block. Having been properly located as will be further described, a hammer blow is applied to the marking wheel by a hammer or plunger 75.

The selection of the proper character or numeral corresponding to the gauged dimension classification of the cylinder bore is effected as follows: A fixed insulated ring 76 carried by arms 57 is provided with a series of electric terminals 77 equally spaced and corresponding in number to the number of individual characters or numerals on the stamping wheel, in this case five in number. Each terminal is adapted to be successively contacted by a wiper contact 78 on a flexible disk segment 79 which is carried by conductor ring 80 the periphery of which engages a contact brush 81 through which current is supplied to the gauging circuits as will be further described in connection with the wiring diagram. The wiping contact 78 rotates with the marking wheel and the arrangement is such that one of the five contacts 77 is energized at the proper time in the sequence of the gauging operation. If the size range of the cylinder bore is classified No. 2 for example, then the No. 2 contact of the terminals 77 will be energized and as soon as the wiping contact 78 reaches it a circuit is closed through the solenoid 72 energizing the solenoid and moving the armature 72 upwardly as viewed in Fig. 5, bringing the stop pawl 68 against the proper notch to stop the stamp wheel so that the No. 2 character is facing the upper side of the cylinder block. Shortly after the wheel 55 is stopped a blow is struck on the plunger or hammer 75 so as to move the marking wheel downwardly about the shaft 58 which carries the arms 57, so that the raised numeral on the marking wheel is indented in the cylinder block which is thus classified in accordance with the particular diameter. After the stamp is applied, the spring 60 pulls the marking wheel up away from the cylinder block when the solenoid 72 is subsequently de-energized at the proper time in the gauging sequence.

As shown in Figs. 1 and 2, the hammers or weights that strike the plungers 75 are heavy arms 83, one for each cylinder bore, pivotally carried on two spaced supporting shafts 84. Each of these arms 83 is raised to its normal elevated position, after the gauging operation and the marking operation have taken place, by means of a roller 85, one for each arm, and carried by the slide 45 so that as the slide is raised to retract the gauging heads, the levers 83 are raised and after their upward movements have been completed they are latched in raised position by latching arms 86, see Fig. 2, carried by the two shafts 87. At one end of each of the shafts 87 is an operating arm 88 fixed to the shaft and pivotally connected to a link 89. The adjacent ends of the two links 89 are pivotally connected at 90 to a vertically movable piston rod 91 controlled by hydraulic fluid pressure and movable upwardly to the position shown in Fig. 2 so as to move the several latch arms 86 into latched position. At the proper time in the sequence of operation, however, an electric switch controls the fluid supply to the fluid pressure cylinder in which the piston 91 operates so as to depress that piston and move the shafts 87 in opposite direction to release the latch arms 86 and permit the arms 83 to fall and strike the plungers of the stamping mechanism all at the same time.

Figure 11:
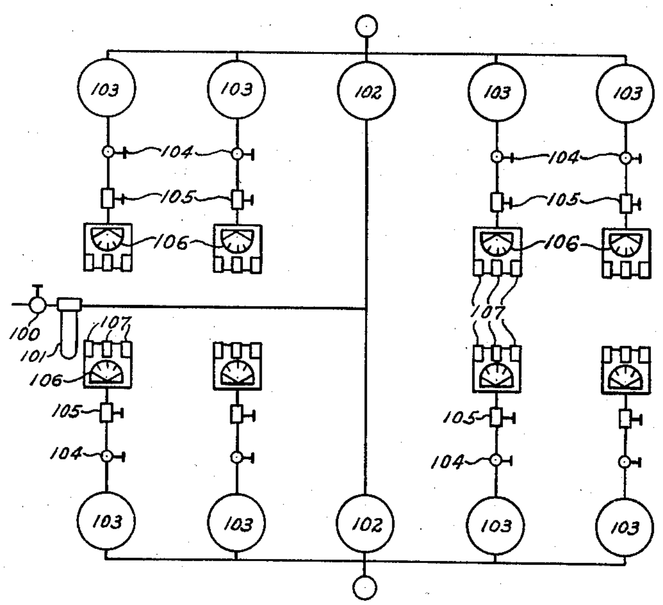
Fig. 11 is a diagrammatic showing of the air supply system of the gauging heads.

There is provision in accordance with the present invention, for adjusting the parts of the air gauging system so that the various switches that are controlled by pressure responsive devices may be properly set to give several different classifications with the use of only a maximum and a minimum master having a predetermined relationship to the part tolerances instead of having a setting master for each one of the five different classification sizes. Thus in accordance with Fig. 11 air under pressure is supplied through an open shutoff valve 100 and a suitable air filter 101 to two primary pressure regulators 102, one for each side of the gauging apparatus. Each pressure regulator 102 is connected at its outlet side to four secondary pressure regulators 103, one for each gauging head. Connected to each of the pressure regulators 103 at its discharge side is a setting valve 104 and an adjustable restrictor 105, the restrictor being connected to a pressure gauge 106 and to the pressure responsive switches 107 and also to the conduit that supplies the regulated air under pressure to the discharge orifices 52 of the gauging head so that the amount of leakage taking place through the gauging nozzles depends on the clearance between the ends of those nozzles and the cylinder bore. The amount of this flow is indicated by the pressure gauge 106 and also determines the condition of the pressure controlled switches 107. Each of these switches 107 may be of the character disclosed in Patent 2,448,653, granted September 7, 1948. The pressure gauge 106 may be a simple pressure gauge having an indicating needle and a scale having maximum and minimum indication markings and three additional equally spaced lines between the maximum and minimum markings on the scale to provide five different positions corresponding to the five different selections to be obtained. In setting up the apparatus for any particular cylinder bore the contacts of the three switches 107 are adjusted to operate at the particular pressures corresponding to the particular size classifications. In making this adjustment the gauging head is first moved beyond its normal raised position by manual control of the various control switches of the electrical system until the nozzles 52 are inside the minimum master 109 contained in the master holder 111 which also contains the maximum master 110. With the gauging head in the minimum master 109 adjustments are made in the pressure regulator 103 and the adjustable restrictor 105 until the pressure gauge 106 shows minimum reading, or in other words until the indicating needle is opposite minimum marking on the scale. The gauging head is then moved into the maximum master 110 and adjustments are made if necessary in the setting of the regulator 103 and the restrictor 105 so that the needle of the indicating gauge 106 reads maximum. Having adjusted the settings of the pressure regulator and the needle valve so that the pressure gauge correctly reads minimum and maximum when the minimum and maximum masters are opposite the gauging nozzles and having adjusted the switches 107 to correspond to maximum and minimum sizes, the operator positions the gauging head in the minimum master and partly closes the setting valve 104 to apply an additional restriction in the path of flow from the regulator 103 to the gauging nozzles until the needle of the gauge 106 comes opposite the size 2 classification mark. He then adjusts the switch 107 for the number 2 classification. Further restriction is then applied by further throttling the flow by controlling the setting 104, still using the minimum master, until the needle of the gauge 106 reads size 3 classification and the switches 107, corresponding to size 3 classification, are then adjusted. This is again repeated to set the gauge for size 4 classification and then the setting valve 104 is opened so that the previously set adjustable restrictor or needle valve 105 will determine the pressure existing at the switches and applied to the pressure gauge and the gauging nozzles under gauging conditions. It will be understood that no adjustment is made in the setting of the restrictor 105 or in the setting of the pressure regulator 103 after adjusting those parts for maximum and minimum master settings with the maximum and minimum masters in place. The addition of a further restriction by throttling the flow through setting valve 104 with the minimum master in place is a temporary expedient employed only during setup to apply proper pressure to pressure controlled switches 107 so they can be adjusted to the particular values obtained for the number 2, 3 and 4 classifications. The same setup operation is then carried out on the air circuits of the other gauging heads until all of the gauging switches are properly adjusted.

Figure 10:
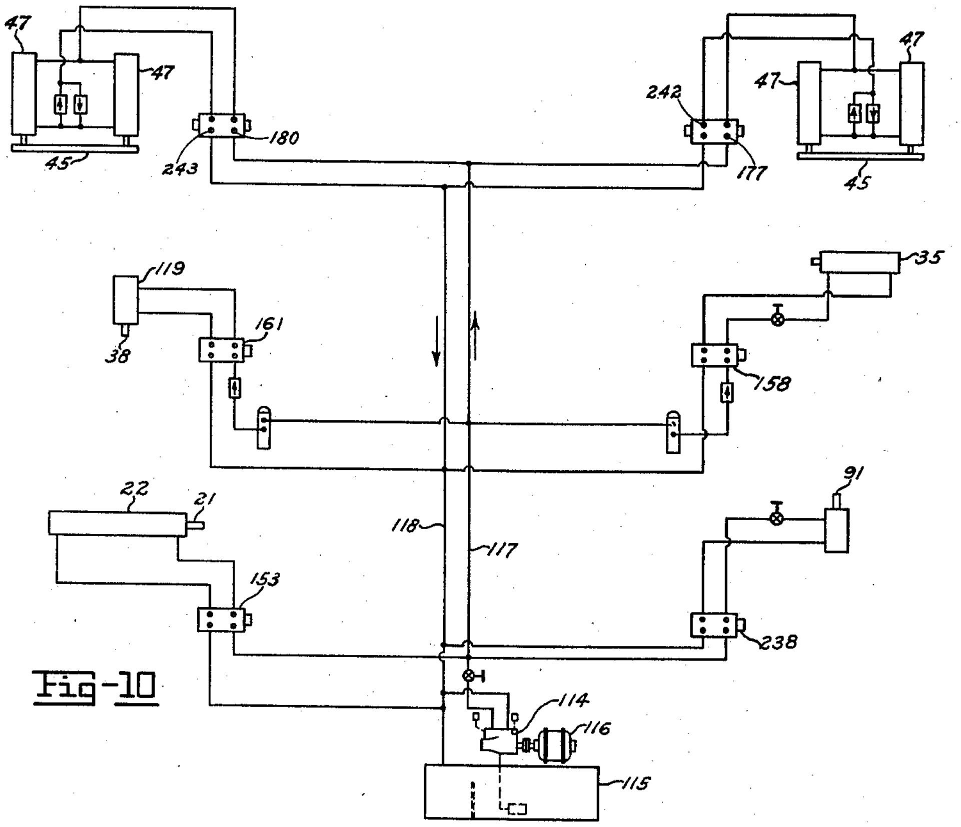
Fig. 10 is a schematic showing of the hydraulic system.

Fig. 10 shows the hydraulic connections of the apparatus. Fluid pressure supplied from a pump 114 connected to a supply tank 115 and operated by a motor 116 which may be contained in the base of the frame 10. Fluid is supplied from the pump 114 to a pressure line 117 and returns to the pump through return line 118. These lines are connected to the feed ram cylinder 22, a clamp cylinder 119 which operates holddown clamp 38, the two left hand cylinders 47 which control the slide 45 holding the gauging heads, the two right hand cylinders 47 for the gauging heads on the other side of the apparatus, the cylinder 35 which controls the locating pin 37 and the trip operating cylinder which controls the piston 91 for tripping the hammer arms 83. Suitable valves are provided in the several hydraulic lines under the control of solenoids which will be referred to more fully in connection with the wiring diagrams so that these several hydraulic cylinders are supplied with fluid at the proper time for their intended operations.

Figure 12:
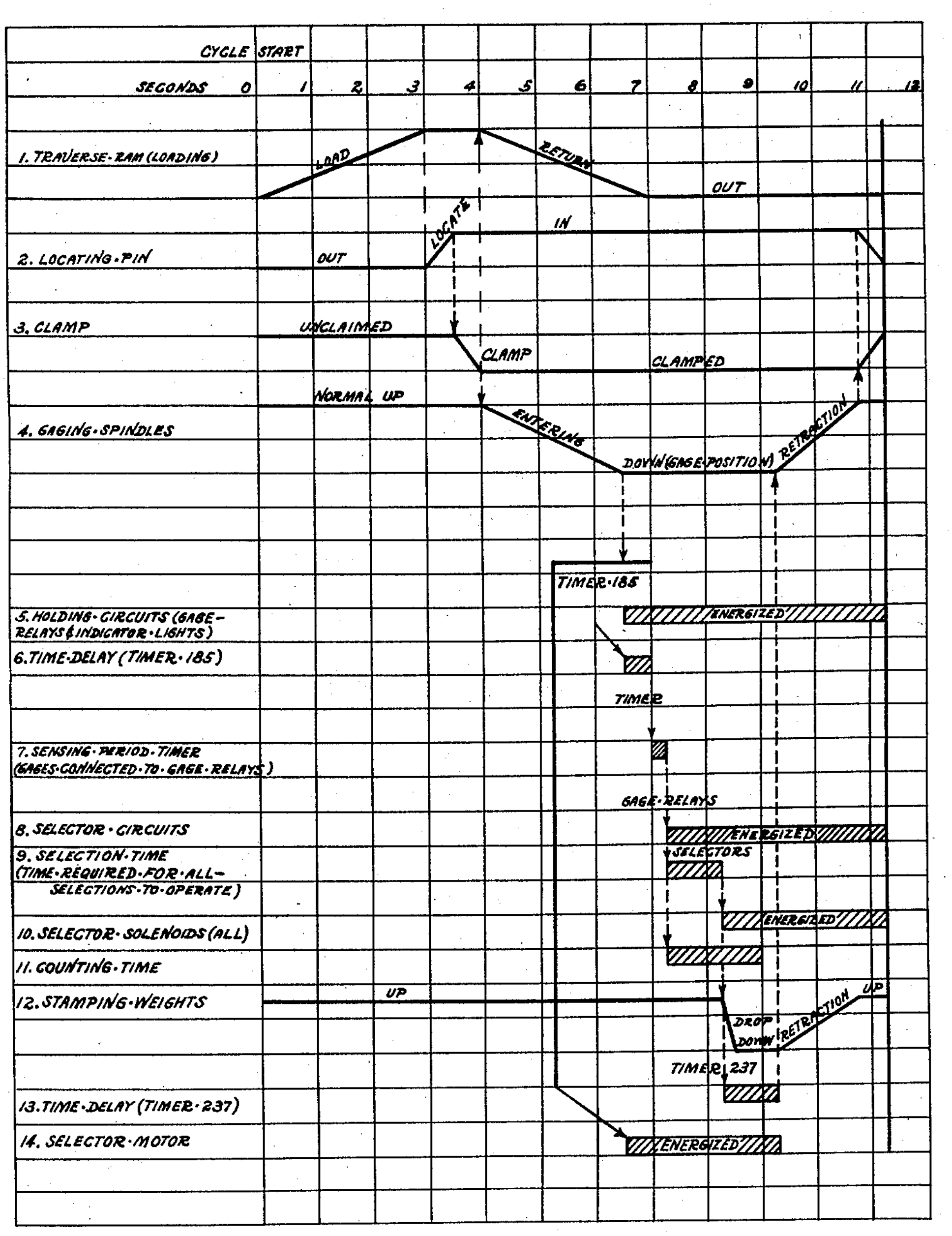
Fig. 12 is a timing diagram showing the time sequence of operation.

Reference to the timing chart illustrated in Fig. 12 shows that at the start of the cycle a feeding or loading operation of the traverse ram first takes place and then immediately the locating pin is moved into the work. After the locating pin is in place, the holddown clamp operates and the gauging spindles then start to descend and at the same time they start to descend the traverse ram starts to return to its normal position ready to engage the next cylinder block supplied to the loading plate 11. After the gauging spindles have been lowered the various holding circuits and gauging lamps and indicating lights are energized and a time-delay relay is energized. This time-delay relay starts a sensing period in which the various gauging switches are connected to their respective relays. The selector circuits are then energized in accordance with the gauge results and after a predetermined time interval sufficient for all of the selections to take place, the selector solenoids are all energized and the stamp weights or levers start dropping. At the start of the sensing period various counters which automatically count the gauged cylinder bores of each particular size classification are energized. After the stamping operation takes place, the stamping levers are raised as the gauging spindles are retracted, the clamp and the locating pins are retracted, the selector and holding circuits are deenergized and the apparatus is ready for another cycle.

Current is supplied to the gauging apparatus, as shown in Fig. 13*a*, from a suitable power source connected through a supply switch 130 to the switches of the hydraulic pump motor 116 and the selector motor 74. A transformer 131 is supplied from the power source and is connected to the main feed lines 132 and 133. With the main supply switch 130 closed, the operator may depress switch 134 and close a circuit through the normally closed stop switch 135 to energize the switch controlling relay 136, the circuit being completed through a manually operable switch 156 a number of which are employed for use during setup operations. In describing the operation, switch controlling relays will be given reference numerals and the switches they control will have the same numeral with a suffix letter. Thus the relay 136 when energized closes a switch **136*a* so as to apply a holding circuit around the start switch 134. Energizing the relay 136 also closes switch 136*b* to start the motor 116. This preconditions the apparatus for a gauging operation. The operator then pushes a second start switch 137 preparatory to initiating a complete cycle of operations. Closing this switch 137 completes a circuit through emergency stop switches 138 and through a relay 139 to close holding switch 139*a* and circuit establishing switch 139*b***.

Having established operating conditions the operator then closes cycle starting switch 142 completing a circuit to the relay 143 which closes a switch **143*a*. The circuit through relay 143 goes through a limit switch 144 which is closed until the holddown clamp is lowered, through a limit switch 145 (shown in Fig. 2) which is closed until the locating pin 37 is raised, through a limit switch 146 which is closed until the holddown clamp 38 starts to descend, through a manually controlled traverse return controlling switch 147, through a normally closed relay controlling switch 213*b* and through another relay controlled switch 178*a* which is closed as soon as switch 139*b* is energized to complete a circuit through relay 178 completed through the limit switches 180** which are closed as long as the gauging head carrying slides are in their raised positions.

When the start switch 142 is temporarily closed a switch 150 is opened to de-energize a relay 151 and open switch **151*b*** to de-energize the holding circuit of the gauge relays that may have been closed from a previous cycle.

When relay 143 is energized it also closes switch **143*b* to complete a circuit through a solenoid operated hydraulic valve 153 which controls the traverse ram cylinder 22 illustrated in Fig. 10. This permits a supply of hydraulic fluid to move the rod 21 and pull the cylinder block into gauging position. At the completion of the travel of the cylinder block the pivoted lever 30 is moved counter clockwise by the block and actuates a limit switch 154. This energizes the lead line 155 and current is supplied through the normally closed manually operated switches 156, to energize a relay 157 which closes switch 157*a* to energize hydraulic valve 158 which controls flow to the locating pin cylinder 35. This causes the locating pin to be raised. When the locating pin is raised, the arm 36 releases the switch 145 and permits it to open but a circuit continues through relay 143 around through the holding circuit switch 143*a*. However, the time this switch 145** opens is not important.

When relay 157 closes it also energizes holding switch **157*b* and a switch 157*c*. When the locating pin 37 is fully raised it closes limit switch 159 to complete a circuit through the clamp relay 160 which energizes a solenoid operated hydraulic valve 161 which initiates downward movement of the holddown clamp 38. Relay 160 also closes a hold-in circuit through switch 160*b*. As soon as the clamp starts to move down it opens the limit switch 146 and here again the time of opening is not significant. When the clamp is fully lowered it closes limit switch 162 and opens switch 144 to deenergize relay 143 and deenergize the solenoid valve 153 permitting return travel of the traverse ram ready to pick up another cylinder block. Return movement of the traverse ram opens the limit switch 154 which it controls and deenergizes the line 155 but this does not deenergize relays 157 or 160 which are supplied from the line side 132 through normally closed switch 151*a* controlled by relay 151** which is not energized.

When the switch 162 closes it energizes a line 163 which supplies current through normally closed and manually operable switches 164, 165 and 166 energizing line 167, limit switches 169, and 170, 171, 172, line 173 relay controlled switches **175*a* energizing relay 176. When the relay 176 is energized as just described, it closes switch 176*a* energizing solenoid operated hydraulic valve 177 to supply fluid to the cylinder 47 of the right hand bank and lower the slide that carries the gauging heads. At the same time a similar circuit is completed through a relay 179 to lower the left hand bank of gauging heads, energization of relay 179 closing relay 179*a* and energizing the solenoid valve 180** for this purpose.

As soon as the slides carrying the gauging heads start down they open the limit switches 180 deenergizing relay 178. Deenergization of relay 179 thus further conditions the circuit through the relay 143 for a subsequent operation. Upon full descent of the gauge head slides the limit switches 181 and 182 are automatically closed to energize relay 183. This relay closes switch **183*a* to complete a circuit through a normally closed manually operable switch 184 through relay 151 and simultaneously energizes a time-delay relay 185. Energization of relay 151 closes switch 151*c* and also closes a switch 151*d* so associated with switch 151*a* as to close before switch 151*a* opens. This transfers the energization of relays 160 and 157 to line 187 through closed switch 151*d*, since switch 151*a* which now opens would otherwise deenergize those relays. Energization of the time-delay relay 185 closes switch 185*a* completing a circuit through closed switch 150, switches 183*a* and 184 and a closed time-delay switch 187*a* and energizes relay 188. This connects the gauge head switches to the gauge relays by closing switches 188*a* to 188*f*** inclusive.

The several switches **188*a* to 188*f* complete circuits through relays 190 to 195 inclusive depending upon the operation of the gauge head controlled switches 107 which are controlled in turn by the air pressure supplied to those switches. The switches 107 operate to divide the acceptable size range into five different classifications as will be further described. At this point it is mentioned that these relays 190 to 195 control circuits which energize only one of the five contacts 77 of the marking head to energize relay 210 closing switch 210*a* to energize the solenoid 72** of the marking mechanism at the proper time to stop rotation of the marking head when the selected numeral is facing the cylinder block. It should also be understood that only one marking mechanism for one cylinder is illustrated in the wiring diagram and that a complete wiring diagram would include similar circuits for each of the other seven cylinders.

It should also be understood that prior to energization of this solenoid 72, the motor 74 which operates the drive belts for the several marking mechanisms had been started by closing control switches **140*a* through energization of relay 140 due to switch 183*b* closed by energization of relay 183 having taken place when the limit switches 181 and 182** closed as previously described.

The electrical switches 107, see Fig. 13*b*, may be of the character disclosed in Patent 2,448,653, these being provided in groups of three for each cylinder bore and with each switch controlling two contacts both of which are closed if the dimension gauged is within a predetermined size range for which the contacts have been adjusted, the size range settings being different for the different switches so that five different selections are obtained within the limits of permissible maximum and minimum tolerance limits. One of these switches as shown in Fig. 13*b* is provided with contacts 196 and 197 connected respectively to relays 190 and 191. If the contacts 196 and 197 are both closed relays 190 and 191 are energized thus closing switches **190*a* and 191*a* and completing a circuit to contact number 5 of the contacts 77 of the marking mechanism. At this time switch 192*a* remains closed this switch being controlled by relay 192 which remains open as the blade of this switch 107 is not closed. Thus switch 192*b* also remains open so that none of the other contacts 4, 3, 2 or 1 can be energized. As soon as the contact 78 of the rotatable wiping brush 79 reaches contact 5, a circuit is closed through lead 198 to energize the relay controlling solenoid 210 as previously mentioned. If for example the dimension of the bore is such as to fall in the number 1 classification so that contact number 1 would be energized, then all the contacts 196 197, 200 and 202 of the switches 107 would be closed except the blades 199 and 201 which would be open. Thus relays 193 and 195 would not be energized but the other relays 190, 191, 192 and 194 would be energized to open switches 192*a* and 194*c* and keeping switches 195*b* and 193*b* closed so that current flows only to contact number 1. Then it is only when the wiping contact 78 reaches contact number 1 that a circuit would be completed through lead wire 198 to energize the solenoid controlling relay 210. Contact number 2 would be energized corresponding to a number 2 classification when relay 193 is energized by closing contact 199 thus opening switch 193*b* to interrupt the circuit to the number 1 contact and closing switch 193*c* to complete a circuit to the number 2 contact, relay 195 remaining open and relays 192 and 194 being closed since they are connected in circuit through the closed blades of their respective switches 107**.

Relays 190 to 195 also control switches **190*d* to 195*d* and 190*e* to 195*e*** respectively to operate signal lamps *l* for the respective relay circuits.

As contact number 1, for example, is energized and even prior to contact 78 reaching it, the wire 204 is energized to supply current through a counting circuit which is generally designated 205. There is an individual control wire for each of the five contacts of each of the eight different cylinder bores. The eight individual wires leading to the eight number 1 classification circuits of the eight cylinder bores are all connected to one bank of a stepping relay having a wiping contact 206, which successively operates along all of these eight terminals and if all eight of them are energized it would produce eight steps in a number 1 classification solenoid counter 207. In a similar manner, a stepping relay circuit and solenoid counters are provided for each of the other classifications. The stepping relay includes contacts 208 all of which must be successively passed over by a wiping contact 209 in any counting period before energization takes place of the relay 212. At the completion of the counting cycle when relay 212 is energized it opens switch **212*a*** which must remain closed for the duration of the counting cycle but open thereafter.

The stepping action of the stepping relay is effected by rectifier 215 supplying D.-C. current to circuits 216 for proper energization of a power solenoid 217 which furnishes power to move the wiping contacts through a complete cycle. Since the detail construction of the stepping relay is of no particular significance, a more detailed description seems unnecessary.

It has already been described how time-delay switch 185 closed to initiate connection of the gauge heads to their gauge relays. At the same time this occurred a circuit was completed through lead wire 230 to energize timer switch 187 which after a time delay closes switch **187*b* and opens switch 187*a*. Closing 187*b* energizes relay 231 to energize the selector circuits that effect the marking. This is accomplished by closing switch 231*a* supplying current from the line side 132** to the marking mechanism circuits.

If all of the cylinders fall within the required tolerance range the switch contacts 196 and 197 are both closed and a relay 232 will be energized, such relay being provided in each selector circuit for each bore. One or the other of the relays 190 or 191 will be deenergized if any cylinder is outside the tolerance range and in such event no current will be supplied through the switches **190*a* or 191*a* and no current flows to the relay 232. Within tolerance limits, however, relay 232 will be energized so that the counting operation can take place. The eight relays 232 when energized close their eight respective switches 232*a***, see Fig. 13*c*, and energize relay 233 and when relay 233 is energized it closes the energizing switch **233*a* of the counting stepping relay, otherwise this relay would not operate. Furthermore unless some one of the contacts of each of the five marking contacts 77 are energized no current will be supplied through lead wire 198 to the relay 210 and the further sequence of operation will stop. The operator will then close switch 235** to cause the gauge heads to be retracted which in turn causes the clamp and the locating pin to be released or withdrawn.

It has been mentioned that relay 210 is energized when the proper numeral on the stamp mechanism has been selected for a particular cylinder. There are seven additional relays, one for each of the other seven bores of the cylinder block, and each of these relays controls individual switches **210*d*** arranged in series, as shown in Fig. 13*b*, to complete a circuit after all of the selecting circuits of the marking devices have been energized, through a relay 236, and also through a timing switch relay 237. Closing of relay 236 energizes a switch **236*a* to energize a solenoid operated hydraulic valve 238 which controls the tripping cylinder to lower rod 91 and trip the weight arms so that all of the marking wheels are simultaneously struck through their operating pins 75** and the several classifications of the different cylinder bores are simultaneously applied to the cylinder block.

Energization of the timer relay 237 closes switch **237*a* to insure continued energization of the selector circuits and act as a hold-in for the relays 151 and 185. After a time delay sufficient for the hammer weights to drop the energization of time-delay relay 237 closes switch 237*b* to energize relays 240 and 241 to close switches 240*a* and 240*b*, thus energizing solenoid operated hydraulic valves 242 and 243 which admits hydraulic fluid to the cylinder 47 on both sides of the machine and raises the slides that carry the gauge heads so they are returned to normal raised position. As the slides start to move upwardly they open limit switches 181 and 182 to deenergize relay 183, and open switch 183*a*, although the circuit is maintained through closed switch 151*c* to the relays 151 and 185. At the upper limit of movement of the gauging head carrying slides, the limit switches 180 are closed again energizing relay 178**, opening switch 178b and deenergizing relays 160 and 157 so that the clamp controlling solenoid valve is deenergized to reverse the direction of flow to the cylinder 119 and raise the clamp. Also a reversing of the direction of the fluid supplied to the cylinder 35 takes place to release the locating pin. The limit switches operated by the clamping mechanism and by the locating pin mechanism having been previously mentioned and these mechanisms return to their normal position because the switches themselves that they control are returned to normal position and condition the several circuits for subsequent gauging operation.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. Gauging apparatus comprising a gauging head adapted for engagement with an article to be gauged, means controlled by said head for gauging the article and including fluid pressure controlled switches, said head having a leakage orifice which determines the pressure applied to the switches in accordance with the gauged dimension of the article, maximum and minimum masters selectively engageable with said head, a pressure gauge connected to the fluid pressure controlled switches and having indicia corresponding to the maximum and minimum masters and additional indicia therebetween, and means for temporarily adjusting the pressure to which the switches are subjected when one of the masters is engaged with the head for setting adjustment of the switches for operation at pressures between the values corresponding to the maximum and minimum masters, whereby the pressure operated switches can be accurately adjusted for response during gauging to dimensions other than those represented by the masters.

2. Gauging apparatus comprising a support for receiving an article to be gauged, a gauging head carried by said support and movable in a path from a retracted position into telescopic engagement with the article, power means connected to actuate said head in its path of movement, means controlled by said head for gauging the article and including fluid pressure controlled switches, said head having a leakage orifice which determines the pressure applied to the switches in accordance with the gauged dimension of the article, maximum and minimum masters selectively engageable with said head, a pressure gauge connected to the fluid pressure controlled switches and having indicia corresponding to the maximum and minimum masters and additional indicia therebetween, and means for temporarily adjusting the pressure to which the switches are subjected when one of the masters is engaged with the head for setting adjustment of the switches for operation at pressures between the values corresponding to the maximum and minimum masters, whereby upon movement of the gauging head into telescopic engagement with the article pressure controlled switches are accurately responsive to article dimensions other than those represented by the masters.

3. Gauging apparatus as set forth in claim 2 adapted for gauging a hole in an article, in which the masters are carried by said support in the path of movement of the head.

4. The method of setting a series of pressure operated switches of a gauge selection system to provide a multiple number of selections between acceptable maximum and minimum limits by using maximum and minimum masters corresponding to the limits of size tolerance which method comprises the steps of predetermining the regulated pressure supplied to a gauging orifice so that the pressure indication of a pressure gauge connected to the pressure operated switches is at a predetermined set up indication with the maximum master applied to the gauging orifice and at another predetermined set up indication with the minimum master applied to the gauging orifice, then while maintaining the regulated pressure of the supply temporarily adjusting the flow of fluid to the gauging orifice applied to one of said masters until the indicator of the pressure gage reaches other predetermined indications between said set up indications, fractionating the space between said two points to provide indications which in conjunction with said set up indications simulate work dimensions at extremities of equal dimensional ranges which together span the size tolerance, adjusting one of said switches for operation when the pressure gauge indicates at each of said predetermined fractionating indications and at each of said set up indications, and then restoring the fluid pressure system to normal flow conditions by removing the temporary adjustment.

5. Apparatus for gauging the dimensional characteristics of a bore in a cylinder block or the like comprising a base, means on said base for supporting a block in gauging position maximum and minimum sized masters, a gauging head including gauging means controlled by the bore dimension, means on said base supporting said head for endwise movement, means on said base mounting said masters in fixed positions in alignment with said head, a gauging circuit operatively connected to said gauging means and responsive thereto and power actuated means operatively connected to move said gauging head within a normal gauging range extending in one direction from a normal retracted position into a bore to be gauged and outside the normal gauging range in the reverse direction beyond the normal retracted position into selective association with said masters for setup of said gauging means.

6. Apparatus for gauging a bore in a cylinder block comprising a base, means on said base supporting a block in gauging position, maximum and minimum sized masters, means on said base mounting said masters in fixed positions, a gauging head, means carrying said gauging head for movement through a normal gauging range extending in one direction from a normal retracted position into a bore to be gauged and for movement in the reverse direction beyond the normal retracted position into association with said masters for set-up, said head including leakage orifices controlled by the bore dimension, a fluid pressure gauging circuit connected to said orifices for obtaining fluid pressure changes in accordance with a gauged dimension, said circuit including fluid pressure controlled switches connected for response to said fluid pressure, a pressure gauge responsive to said pressure and having indicia thereon corresponding to the dimensions of the maximum and minimum sized masters and additional indicia corresponding to the respective dimensions and pressures at which the respective switches are to operate, and means for temporarily adjusting the pressure to which the switches are subjected for adjusting each respective switch to operate at one of the pressures represented by the additional gauge indicia.

7. Gauging apparatus comprising a pressure regulator adapted for connection to a source of air under pressure, a calibrated pressure gauge and a gauging head having leakage orifices controlled by a work dimension, conduit means placing the recited components in series communication in the order named, a plurality of adjustable pressure responsive switch means connected to said conduit means between the regulator and gauging head, maximum and minimum masters selectively applicable to said head, a first adjustable restriction in said conduit means between the regulator and switch means said regulator and first restriction being adjustable between them to a setting of each providing predetermined indications on said pressure gauge as each of the masters are selectively applied to the gauging head, a second adjustable restriction in said conduit means between the regulator and switch means temporarily adjustable to obtain a predetermined indication at which each of the switch means is adjusted to respond and to restore control of the apparatus to the regulator and first restriction means for gauging.

8. Gauging apparatus comprising a gauging head adapted for engagement with an article to be gauged, means controlled by said head for gauging a dimension of the article and including fluid pressure controlled switches, said head having a leakage orifice which determines the pressure applied to the switches in accordance with the gauged dimension of the article, maximum and minimum masters selectively engageable with said head, a pressure gauge connected to the fluid pressure controlled switches and having master reference indicia corresponding to dimensions of the maximum and minimum masters and additional indicia therebetween so located thereon with reference to each other and to said reference indicia as to fractionate the space in accordance with predetermined dimensional limits of article classification ranges, and means for temporarily adjusting the pressure to which the switches are subjected when one of the masters is engaged with the head for setting adjustment of the switches for operation at pressures and dimensions corresponding to said fractionating indicia between the valves corresponding to the maximum and minimum masters, whereby the pressure operated switches can be accurately adjusted for response during gauging to dimensions other than those represented by the masters.

9. A method for setting up a gauging system in which air pressure responses determined by work dimensions at a gauging head are applied to a calibrated pressure gauge and to adjustable pressure switches to provide electric signals at a plurality of predetermined work dimensions differing from the dimensions of maximum and minimum set up masters, such method comprising the steps of applying one of said masters to the gauge head, adjusting the supply condition of the system to obtain a gauge response at a predetermined set up indication on the gauge corresponding to the dimension of the respective master, substituting the other of said masters at the gauge head, adjusting the supply condition as necessary to obtain a gauge response at a second predetermined set up indication thereon corresponding to the dimension of said other master, reapplying the masters and repeating the adjustments of the supply condition as necessary to obtain gauge indications at the respective set up indicia with the maximum and minimum masters alternatively applied, thus establishing gauging amplification and a predetermined pressure range by physical reference to two known masters, adjusting the supply condition of the system to sequentially obtain a plurality of different pressure indications on the gauge at different indicia spaced from said set up indicia in accordance with the relationship between each of a plurality of predetermined work dimensions and dimensions of said masters to thus pneumatically simulate such work dimensions, and at each of said different indications adjusting one of the pressure responsive switches for response at the pneumatically simulated dimension.

10. A method for setting up a gauging system in which air pressure responses determined by work dimensions at a gauging head are applied to a calibrated pressure gauge and to adjustable pressure switches to provide electric signals at a plurality of predetermined work dimensions including those of maximum and minimum set up masters corresponding respectively to maximum and minimum part tolerances, such method comprising the steps of applying one of said masters to the gauge head, adjusting the supply condition of the system to obtain a gauge response at a predetermined set up indication on the gauge corresponding to the dimension of the respective master, substituting the other of said masters at the gauge head, adjusting the supply condition as necessary to obtain a gauge response at a second predetermined set up indication thereon corresponding to the dimension of said other master, reapplying the masters and repeating the adjustments of the supply condition as necessary to obtain gauge indications at the respective set up indicia with the maximum and minimum masters alternatively applied, thus establishing gauging amplication and a predetermined pressure range by physical reference to two known masters, adjusting the supply condition of the system to sequentially obtain a plurality of different pressure indications on the gauge at different indicia relatively spaced between said set up indicia to thus pneumatically simulate predetermined work dimensions which in conjunction with the master dimensions define a plurality of work classifications of equal dimensional ranges which together span the part tolerance, and with the gauge sequentially indicating at each of said indicia adjusting one of the pressure responsive switches for response at each of the master and the pneumatically simulated dimensions to provide classification defining electric signals.

References Cited in the file of this patent

UNITED STATES PATENTS

| | | |
|---|---|---|
| 2,448,653 | Aller | Sept. 7, 1948 |
| 2,513,374 | Stead | July 4, 1950 |
| 2,647,456 | Aller et al. | Aug. 4, 1953 |
| 2,677,325 | Aller | May 4, 1954 |